United States Patent
Peerlings et al.

(10) Patent No.: US 6,765,047 B2
(45) Date of Patent: Jul. 20, 2004

(54) MICROENCAPSULATION OF RED PHOSPHORUS

(75) Inventors: Henricus Peerlings, Solingen (DE); Michael Wagner, Moers (DE); Wolfgang Podszun, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 242 days.

(21) Appl. No.: 10/155,054

(22) Filed: May 24, 2002

(65) Prior Publication Data

US 2002/0188049 A1 Dec. 12, 2002

(30) Foreign Application Priority Data

Jun. 1, 2001 (DE) ......................................... 101 26 759

(51) Int. Cl.⁷ .............................. C08J 3/00; C08K 3/32; C08K 9/00; C08L 51/00; C08L 61/00
(52) U.S. Cl. ...................... 524/414; 523/200; 523/205; 523/208; 524/541; 524/542; 524/593; 524/594; 524/595
(58) Field of Search .................................. 523/200, 205, 523/208; 524/414, 593, 594, 595, 541, 542

(56) References Cited

U.S. PATENT DOCUMENTS

| | | | |
|---|---|---|---|
| 3,778,407 A | 12/1973 | Hild et al. | 260/37 N |
| 3,883,475 A | 5/1975 | Racky et al. | 260/45.7 P |
| 4,242,240 A | 12/1980 | Cerny et al. | 260/14 |
| 4,440,880 A | 4/1984 | Albanesi et al. | 523/205 |
| 4,493,913 A | 1/1985 | Hirobe et al. | 523/205 |
| 5,466,741 A | 11/1995 | Bonin et al. | 524/405 |

FOREIGN PATENT DOCUMENTS

| | | |
|---|---|---|
| DE | 196 19 701 | 11/1996 |
| EP | 0 278 555 | 8/1988 |
| WO | 87/00187 | 1/1987 |

*Primary Examiner*—Patrick D. Niland
(74) *Attorney, Agent, or Firm*—Joseph C. Gil; Aron Preis

(57) ABSTRACT

A method for microencapsulating red phosphorus in polymerized urea resorcinol formaldehyde resin is disclosed. The method entails (i) preparing an aqueous mixture containing urea, resorcinol and formaldehyde, (ii) adding hexamethylene tetramine and optionally water to the mixture to yield a stabilized mixture (iii) dispersing red phosphorus in the to the stabilized mixture (iv) adding acid to the reaction mixture, and (v) collecting the resulting encapsulated red phosphorus. The product is suitable as flame retarding agent in molding compositions.

15 Claims, No Drawings

MICROENCAPSULATION OF RED PHOSPHORUS

FIELD OF THE INVENTION

The invention relates to red phosphorus and more particularly to a method of microencapsulating red phosphorus.

SUMMARY OF THE INVENTION

A method for microencapsulating red phosphorus in polymerized urea resorcinol formaldehyde resin is disclosed. The method entails (i) preparing an aqueous mixture containing urea, resorcinol and formaldehyde, (ii) adding hexamethylene tetramine and optionally water to the mixture to yield a stabilized mixture (iii) dispersing red phosphorus in the stabilized mixture (iv) adding acid to the reaction mixture, and (v) collecting the resulting encapsulated red phosphorus. The product is suitable as flame retarding agent in molding compositions.

BACKGROUND OF THE INVENTION

Red phosphorus has long been known to be an extremely effective flame retardant, particularly for fibreglass-reinforced polyamides and a number of other plastics.

Thus the use of red phosphorus in reinforced polyamide molding compositions is described for example in DE-A 1 931 387.

However considerable risks are involved in handling red phosphorus, especially when working it into plastic molding compounds at elevated temperatures. Thus red phosphorus forms highly toxic phosphines by the action of atmospheric oxygen and humidity, particularly at temperatures up to over 300° C. which are typical for processing industrial plastics. Apart from their toxicity phosphines are extremely critical owing to their self-ignition potential, and there is an additional hazard of self-ignition of the red phosphorus itself.

Many attempts have therefore been made in the past to improve the handling properties of red phosphorus when it is worked into plastic molding compounds and to make the process safer.

For example attempts have been made to suppress phosphine formation by mixing metal salts into the red phosphorus. The salts may be metal oxides and hydroxides combined with other metal compounds or additives. This is described inter alia in DE-A 2 308 104, EP-A 278 555 and EP-A 557 222.

Articles have also been published describing the stabilisation of red phosphorus by encapsulation. Thus red phosphorus encapsulated by precipitation of silicon dioxide or application of melamine formaldehyde resin is known from DE-A 2 646 835, DE-A 19 619 701 and EP-A 052 217. Coating with phenol formaldehyde resin is disclosed in DE-A 2 625 673.

WO 87/00187 describes the combination of urea resorcinol and formaldehyde for microencapsulation of red phosphorus. The method comprises adding the encapsulation components to an aqueous suspension of red phosphorus, condensation of the reagents being achieved by lowering the pH. A drawback of the version described is that the phosphine liberation rate of the microencapsulated red phosphorus is still high, and also that the space-time yield of the reaction relative to red phosphorus is low. (The space-time yield is understood in this context as being the solids content of red phosphorus to be encapsulated in the total aqueous reaction mixture used which is converted per unit time; this may be described inter alia by the weight ratio of red phosphorus put into the reaction to the total water content). Another drawback of the reaction in dilute solution/suspension is that a relatively large amount of acid has to be added to start the condensation reaction, and this then has to be neutralized with correspondingly large quantities of alkali solution when reconditioning the production effluent.

The object of the invention is to find an alternative method of microencapsulating red phosphorus with urea resorcinol formaldehyde resin, which will firstly improve the properties of microencapsulated red phosphorus in terms of its phosphine liberation rate and secondly give a greatly improved space-time yield.

DETAILED DESCRIPTION OF THE INVENTION

It has been found that the set object of microencapsulating red phosphorus with urea resorcinol formaldehyde resin may be achieved by a method which is the subject of the invention, wherein
a mixture of
  0.4 to 4 wt. % urea,
  2 to 20 wt. % resorcinol and
  5 to 150 wt. % formaldehyde,
each relative to the weight of red phosphorus used, is polymerised in aqueous phase in the presence of finely divided red phosphorus suspended by known mixing methods (Ullmann's Encyclopedia of Industrial Chemistry, VCH 1988, Vol. B2, page 25-1 to 25-33 and literature quoted therein; Ullmann's Encyclopedia of Industrial Chemistry, VCH Publishers Inc. 1992, Vol. B4, page 87–120 and page 167–180 and literature quoted therein) and 0.1 to 8 wt. % hexamethylene tetramine, relative to the weight of red phosphorus used, by adding sufficient acid to adjust the pH of the mixture to 0 to 5, the temperature of the reaction mixture preferably being kept at 25 to 150° C. for 0.5 to 24 hours and, according to the invention, the weight ratio of red phosphorus to water being adjusted to 1:0.3 to 1:3. "Water" refers here to the entire aqueous phase including the water content of any formaldehyde solution used. Here and in the following the percentages given for the substances used are percentages by weight. The reaction may be carried out at pressures from 0.8 to 12 bar. "Formaldehyde" is understood in this context as being either pure formaldehyde or formaldehyde solutions in water, which may further be mixed with 10 to 15 wt. % of a stabilizer such as methanol. The use of aqueous formaldehyde solutions has proved successful in the invention, a 37 wt. % solution stabilised with 10 to 15% methanol being particularly preferred. "Red phosphorus" refers in this context to any colored allotropic forms of phosphorus in finely divided form. The particles normally have a mean size of 0.1 to 100, preferably 0.2 to 50 and particularly preferably 10 to 50 μm. The particle size of the phosphorus may be adjusted by grinding, particularly by wet grinding with a ball or bead mill. A suitable grinding medium is either water or organic solvents such as toluene, petroleum, dimethylformamide, dimethylacetamide or formic acid.

It has been found that under the processing conditions of the invention mixtures preferably of 0.5 to 3.0% urea, 5 to 15% resorcinol, 10 to 100% formaldehyde and 1 to 6% hexamethylene tetramine relative to the red phosphorus used react smoothly to form very dense microcapsules which are superior to the described state of the art. The mixtures which are particularly preferred in this connection comprise 1 to 2.5% urea, 7 to 12% resorcinol, 25 to 90% formaldehyde and 2 to 6% hexamethylene tetramine, each relative to the red phosphorus employed.

Red phosphorus encapsulated by the method of the invention is made up of particles substantially of a core-shell structure.

It has also been found in the invention that particularly good results may be obtained by using reaction temperatures from 50 to 150° C. and particularly preferably from 70 to 150° C.

In addition to the conditions described, reaction times from 0.5 to 12 hours, especially from 1.5 to 5 hours, have proved particularly successful.

With regard to the space-time yield, which may be expressed by the weight ratio of red phosphorus put into the reaction to the water contained in the mixture, including the weight content of a formaldehyde solution used, it has been found that phosphorus: water weight ratios well above 1 in favor of the red phosphorus content may be used in the method of the invention.

It has been found, surprisingly, that raising the solids content of the reaction mixture does not cause the red phosphorus to form lumps consisting of agglomerated particles which are not completely encapsulated. The reduction of the weight content of water in relation to red phosphorus according to the invention in fact considerably lessens subsequent liberation of phosphine from the microencapsulated red phosphorus obtained by the method of the invention. According to the invention the best results may be obtained in this connection with a red phosphorus to water ratio of 1:0.3 to 1:2.5 or particularly preferably from 1:0.35 to 1:1.5.

It has also been found that the quality of encapsulated red phosphorus obtained by the method of the invention may be further improved by raising the pressure in the reaction vessel. The working pressure range is preferably from 0.8 to 8 bar or particularly preferably from 0.8 to 5 bar.

Microencapsulation may be carried out in any of a variety of reactors. These include inter alia glass apparatus optionally equipped with a reflux cooling system, auto-claves in a wide variety of constructions and sizes, particularly vessels made of steel enamel, equipped with agitators, heaters and feed, discharge and pumping means known to persons skilled in the art. The reaction vessels used may additionally have appropriate devices to neutralize them with suitable inert gases such as argon, carbon dioxide or nitrogen.

The red phosphorus microencapsulated according to the invention is produced by suspending particulate red phosphorus, normally with a mean particle size of 0.1 to 100 μm, in an aqueous phase containing urea, resorcinol, formaldehyde and the above-mentioned quantities of hexamethylene tetramine at a pH of 6 to 13 by conventional methods (Ullmann's Encyclopedia of Industrial Chemistry, VCH 1988, Vol. B2, page 25-1 to 25-33 and the literature quoted therein; Ullmann's Encyclopedia of Industrial Chemistry, VCH Publishers Inc. 1992, Vol. B4, page 87–120 and page 167–180 and the literature quoted therein), after which the pH is reduced to 0 to 5 by adding a strong acid.

It has been found that the resin-forming reaction with the composition according to the invention may be started particularly effectively at a pH from 0 to 3, and the best results are obtained at a pH between 0 and 1.5.

The acid used is preferably inorganic; phosphoric, hydrochloric, sulphuric or nitric acid is particularly preferred, especially sulphuric acid. The use of sulphuric acid has proved to be particularly advantageous in the invention. Unlike phosphoric acid the use of sulphuric acid does not create any problems in the disposal of effluent through biological sewage purification systems, where large quantities of phosphates and their derivatives would be prohibited After the addition of acid the reaction mixture is kept at the temperature already described. The reaction may be carried out in an inert gas atmosphere, nitrogen and carbon dioxide being preferred, particularly nitrogen.

The microencapsulated red phosphorus may easily be isolated from the suspension by sedimentation, filtering and/or centrifuging. For this purpose the encapsulated material including the mother liquor may, for example, be placed directly on a frit (Frit means a sintered glass filter that enables the separation of solids and liquid from suspensions as the fit's material is only permeable for the liquid on condition that its pare diameter is smaller than the particle size of the solid to be isolated) or Büchner funnel and separated, optionally by applying suitable vacuum. It is also possible to transfer all the material directly from the reactor to a centrifuge, if necessary with the aid of a pumping system. The centrifuge may be neutralizable in this connection and if necessary operated quasi-continuously.

Washing, for example with water or alcohol, may also be used for further cleaning.

The separated microencapsulated red phosphorus may be dried in known manner, for example by means of vacuum drying ovens, drying ovens with air circulation or tumble or blade-type dryers.

Red phosphorus microencapsulated by the method of the invention is eminently suitable for flameproofing plastics or blends of two or more different plastics. These include thermoplastic ones such as homo- and copolymers of olefinically unsaturated monomers such as polyfluoroethylene, polyethylene, polypropylene, ethylene/-propylene copolymers, polystyrenes, styrene/acrylonitrile copolymers, ABS copolymers (acrylonitrile/butadiene/styrene), vinyl chloride homo- and copolymers, polyacrylates, particularly poylmethylmethacrylate, vinyl acetate copolymers, polyacetals, polycarbonates, particularly polycarbonates based on bisphenol A and bisphenol derivatives, polyesters, polyamides, i.e. known homopolyamides, copolyamides and mixtures of those polyamides. Polyamides and polyesters are preferred and polyamides particularly preferred.

The plastics may contain reinforcing fillers, for example glass fibres, or fillers which give the moldings certain features, for example fillers acting as lubricants or inert fillers such as kaolin or talc. They may further contain many additives such as anti-oxidants, heat or light stabilizers, dyes, pigments or other functional additives, and in particular preferably additives in the form of organic and inorganic metal compounds. These preferably include oxides and sulphides of zinc, oxides and hydroxides of magnesium, copper oxide, iron oxides, metal carbonates such as calcium or magnesium carbonate, talcite or hydrotalcite (hydrates of metal carbonates), borates particularly zinc borate and generally stoichiometric mixtures of metal compounds/oxides. Lanthanides and salts thereof, preferably cerium and substances containing it, salts such as Ce(IV)oxide or $CeO_2$ are also included.

Additional use of polymers with rubber-like elasticity (often described as impact resistance modifiers, elastomers or rubber) may in many cases prove advantageous to the mechanical properties.The polymers include copolymers preferably formed from at least two of the following monomers: ethylene, propylene, butadiene, isobutene, isoprene, chloroprene, vinyl acetate, styrene, acrylonitrile and acrylic or methacrylic acid esters with 1 to 18 carbon atoms in the alcohol component. Polymers of this type are described for example in Houben-Weyl, Methoden der organischen Chemie, Vol. 14/1 (Georg-Thieme-Verlag, Stuttgart, 1961), pages 392 to 406 and in the article by C B. Bucknall "Toughened Plastics" (Applied Science Publishers, London, 1977).

Rubber-elastic polymers as described in WO-A 00/46419 are preferred.

The subject of the invention is microencapsulated red phosphorus made by the method of the invention—microencapsulated red phosphorus where the weight content of the wall of the capsule is 1 to 50 wt. %, preferably 5 to 25% relative to the total weight of phosphorus and capsule wall, being preferred—and the production method itself.

Another subject is the use of red phosphorus microencapsulated according to the invention as a flame retardant in plastics and plastic blends, industrial thermoplastic materials, particularly polyamides and polyesters being preferred.

The subject matter of the invention also includes molding compounds containing a red phosphorus microencapsulated by the method of the invention. Another subject is molding compounds additionally containing one or more fillers such as glass fibres and/or talc, glass fibres being particularly preferred. A further subject is molding compounds according to the invention additionally containing one or more inorganic or organic metal compounds, metal salts and/or metal complexes. They may also contain impact resistance modifiers.

The molding compositions according to the invention may also optionally contain one or more additional flame retardants.

The molding compositions according to the invention which are preferred in this instance are characterized in that the additional flame retardant is a melamine compound, preferably melamine and particularly preferably melamine cyanurate and/or an organophosphorus compound and/or a further halogen-free compound.

Another subject of the invention is molding compounds, the metal compounds being substances from the metal oxide, metal carbonate, metal hydroxide, metal sulphide and metal carbonate hydrate group or preferably from the zinc and magnesium salt group in which zinc oxide, zinc fluoride, zinc sulphide, zinc borate, magnesium oxide and magnesium hydroxide and mixtures thereof are particularly preferred. Lanthanides and salts thereof are also included, preferably cerium and substances/-salts containing them such as Ce(IV) oxide or $CeO_2$. These minerals may also be coated with known media or be surface-treated.

A further subject of the invention are articles molded from the molding compositions according to the invention.

The invention will be further explained by the following examples.

EXAMPLES

Example 1

A glass reaction vessel provided with a reflux cooler and a KPG agitator is charged with 30.6 g urea, 151.8 g resorcinol, 1,125.0 ml of a 37% formaldehyde solution stabilised with 10% methanol, and 59.1 g hexamethylene tetramine together with 2,250 ml water. 1,500 g red phosphorus is next added and the mixture is agitated.

Enough sulphuric acid to reach a pH of 1.5 is then added with further strong agitation 10 and the mixture is heated at 100° C. for 2 hours. It is cooled to room temperature, after which the microencapsulated red phosphorus is separated by means of a frit. The filter cake is washed with water until the washing water collected has a pH of at least 5, then dried at 70° C. in a vacuum drying oven or optionally in a drying oven with air circulation.

Example 2

500 g red phosphorus is added to a solution of 19.7 g hexamethylene tetramine, 50.7 g resorcinol, 10.2 g urea, 375 ml of a 37% formaldehyde solution stabilised with 10% methanol, and 375 ml water in an apparatus as described in Example 1. When the mixture has been suspended well by means of the agitator concentrated sulphuric acid is added until a pH of 1.5 is reached. The reaction mixture is agitated under reflux for 2 hours, cooled to room temperature then filtered through a frit and washed with water until the washing water collected has a pH of at least 5. When the filter cake has been completely separated it is dried at 70° C. in a vacuum drying oven or optionally in a drying oven with air circulation.

Example 3

500 g red phosphorus is added to a solution of 19.7 g hexamethylene tetramine, 50.7 g resorcinol, 10.2 g urea and 375 ml of a 37% formaldehyde solution stabilised with 10% methanol in an apparatus as described in Example 1. When the mixture has been suspended well by means of the agitator the pH is adjusted to 1.5 with concentrated sulphuric acid. The reaction mixture is agitated under reflux for 2 hours, cooled to room temperature then filtered through a frit and washed with water until the washing water collected has a pH of at least 5. When the filter cake has been completely separated it is dried at 70° C. in a vacuum drying oven or optionally in a drying oven with air circulation.

Example 4

A 350 ml stainless steel autoclave with an agitator and an inert gas supply is used and 2.04 g urea, 10.14 g resorcinol, 75 ml of a 37% formaldehyde solution stabilised with 10% methanol, 3.8 g hexamethylene tetramine and 75 ml E water (=demineralized water) are put in first. After the introduction of 100 g red phosphorus 4 ml concentrated sulphuric acid is added, the reactor is put under 2.4 bar nitrogen and the mixture is agitated for 2 hours at a temperature of 100° C. and a pressure of 4.4 bar. The entire mixture is then discharged into a standing vessel and the microencapsulated red phosphorus is washed with water, which is decanted, until the used washing water has a pH of at least 5. The product is then dried at 70° C. in a vacuum drying oven.

Comparative Example 5

Microencapsulation according to WO 87/00187, Example 4 thereof: 1,000 g red phosphorus is added to a solution of 20 g urea, 50 g resorcinol, 400 ml formaldehyde solution stabilised with 10% methanol, and 3,000 ml water in an apparatus as described in Example 1. When the mixture has been suspended well by means of an agitator concentrated sulphuric acid is added until a pH of 1.5 is reached. The reaction mixture is agitated under reflux for 2 hours. The reaction mixture is filtered through a frit and washed with water until the water collected has a pH of at least 5. When the filter cake has been completely separated it is dried at 70° C. in a vacuum drying oven or optionally in a drying oven with air circulation.

Presently relevant test results of the preceding examples are summarized in the following table together with the phosphine values determined for the separated microencapsulated $P_{red}$ products:

| Example | Yield Weight ratio $P_{red}$ water* | Liberation of phosphine** | Pressure |
|---|---|---|---|
| 1 | 1:1.9 | 18 ppm | normal*** |
| 2 | 1:1.1 | 8 ppm | normal |
| 3 | 1:0.4 | 8 ppm | normal |
| 4 | 1:1.1 | <5 ppm | 4.4 bar |
| 5 (comparison) | 1:3.2 | 80 ppm | normal |

*Water added for dilution including water content of formaldehyde solution
**With a temperature of 280° C. applied to the microencapsulated red phosphorus after 10 minutes, relative to 100 mg non-encapsulated red phosphorus
***Normal pressure = "Normal pressure" is understood in this context as being the air pressure prevailing at room temperature while the test is being carried out, within the range of its natural fluctuations.

It is clear from Examples 1, 2 and 3 that the rate of phosphine liberation from the microencapsulated phosphorus product is significantly reduced according to the invention. Further improvement of the quality of the product may be obtained by carrying out the reaction under pressure (see Example 4).

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A method for microencapsulating red phosphorus in polymerized urea resorcinol formaldehyde resin, comprising
   (i) preparing a mixture containing
      a) 0.4 to 4 wt. % urea,
      b) 2 to 20 wt. % resorcinol and
      c) 5 to 150 wt. % formaldehyde,
   (ii) adding to the mixture 0.1 to 8 wt. % hexamethylene tetramine in an aqueous phase to yield a stabilized mixture,
   (iii) dispersing red phosphorus in the to the stabilized mixture to yield a reaction mixture wherein weight ratio of red phosphorus to water is 1:0.3 to 1:3, and
   (iv) adding acid to the reaction mixture to reach a pH of 0 to 5, while maintaining the temperature of the reaction mixture at 25 to 150° C., and
   (v) collecting red phosphorus that is encapsulated in a shell of polymerized urea resorcinol formaldehyde resin,
   said wt. % being relative to the weight said red phosphorus.

2. The method according to claim 1 wherein said mixture contains 0.5 to 3.0 wt. % urea, 5 to 15 wt. % resorcinol, 10 to 100 wt. % formaldehyde and 1 to 6 wt. % hexamethylene tetramine.

3. The method according to claim 1 wherein the temperature is 50 to 150° C.

4. The method according to claim 1 wherein pH is 0 to 3.

5. The method according to claim 1 wherein the acid is a mineral acid.

6. The method according to claim 1 wherein the weight ratio of red phosphorus to water is 1:0.3 to 1:2.5.

7. The method according to claim 1 where the reaction mixture is under pressure of 0.8 to 8 bar.

8. The microencapsulated red phosphorus prepared by the method of claim 1.

9. The microencapsulated red phosphorus according to claim 8, wherein the weight of the shell 1 to 50 wt. % relative to the total of the encapsulated red phosphorus.

10. A method of using the microencapsulated red phosphorus of claim 1 comprising incorporating said phosphorus in a resinous molding composition.

11. A molding composition comprising a plastic resin and the microencapsulated red phosphorus according to claim 8.

12. The molding composition according to claim 11 further comprising at least one member selected from the group consisting of inorganic or organic metal compounds, metal salts and metal complexes.

13. The molding composition according to claim 11 further containing at least one member selected from the group consisting of anti-oxidants, heat stabilizers, light stabilizers, dyes, pigments and reinforcing materials.

14. The molding composition of claim 11 further containing one or more additional flame retardants.

15. A molded article comprising the molding composition of claim 11.

* * * * *